US005091877A

United States Patent [19]

Itoh et al.

[11] Patent Number: 5,091,877

[45] Date of Patent: Feb. 25, 1992

[54] DATA PROCESSING APPARATUS

[75] Inventors: Yoshikazu Itoh, Tokyo; Shunji Wake, Kawasaki, both of Japan

[73] Assignees: Ikegami Tsushinki Co., Ltd.; Video Research Ltd., both of Tokyo, Japan

[21] Appl. No.: 600,139

[22] Filed: Oct. 19, 1990

Related U.S. Application Data

[63] Continuation of Ser. No. 241,296, Sep. 7, 1988, abandoned.

[30] Foreign Application Priority Data

Sep. 9, 1987 [JP] Japan ................................ 62-226069

[51] Int. Cl.$^5$ ................................................ G06F 3/04

[52] U.S. Cl. ........................................ 395/200; 358/84; 358/85

[58] Field of Search ........................ 364/200, 300, 900; 358/85-87; 379/92, 94, 96, 98, 106

[56] References Cited

U.S. PATENT DOCUMENTS

| | | | |
|---|---|---|---|
| 3,483,327 | 12/1969 | Schwartz | 358/84 |
| 4,104,486 | 8/1978 | Martin et al. | 379/106 |
| 4,247,908 | 1/1981 | Lockhart, Jr. et al. | 364/900 |
| 4,331,973 | 5/1982 | Eskin et al. | 358/84 |
| 4,331,974 | 5/1982 | Cogswell et al. | 358/84 |
| 4,404,589 | 9/1983 | Wright, Jr. | 358/86 |
| 4,451,701 | 5/1984 | Bendig | 358/85 |
| 4,455,453 | 6/1984 | Parasekvakos et al. | 379/93 |
| 4,541,056 | 9/1985 | Matthews | 364/300 |
| 4,603,232 | 7/1986 | Kurland et al. | 358/84 |
| 4,649,533 | 3/1987 | Chorley et al. | 379/94 |
| 4,654,868 | 3/1987 | Shelley | 379/106 |
| 4,745,468 | 5/1988 | Von Kohorn | 358/84 |
| 4,847,892 | 7/1989 | Shelley | 379/92 |
| 4,905,080 | 2/1990 | Watanabe et al. | 358/84 |

FOREIGN PATENT DOCUMENTS

| | | |
|---|---|---|
| 128481 | 12/1984 | European Pat. Off. . |
| 54-101607 | 8/1979 | Japan . |
| 87-00678 | 2/1988 | Japan . |
| 63-37726 | 2/1988 | Japan . |
| 63-37727 | 2/1988 | Japan . |
| 63-88673 | 4/1988 | Japan . |
| 2143354 | 2/1985 | United Kingdom . |

OTHER PUBLICATIONS

Gregoire, "New Autodialling Modems for the PSTN", Commutation & Transmission, Sotelec Limited, Paris, 1986, 8th Year, No. 3, pp. 47-66.

Tanenbaum, *Computer Networks,* 1981, pp. 231-235, Prentice-Hall, Inc., Englewood Cliffs, N.J.

*Primary Examiner*—Dale M. Shaw

*Assistant Examiner*—David D. Knepper

*Attorney, Agent, or Firm*—Spencer & Frank

[57] ABSTRACT

A data processing apparatus for use in an electronic data research system in which data produced at respective panelist' home is transmitted to a data center via a telephone link which is commonly used by a telephone set of the panelist' home, there are provided a center call mode in which the data is transmitted to the data center in response to the polling from the data center within a predetermined time gate, a terminal call mode in which the data is transmitted to the data center at a predetermined time out of the time gate, and a real time mode in which current data is transmitted to the data center while the connection between the panelist home and data center via the telephone link is continuously made.

9 Claims, 9 Drawing Sheets

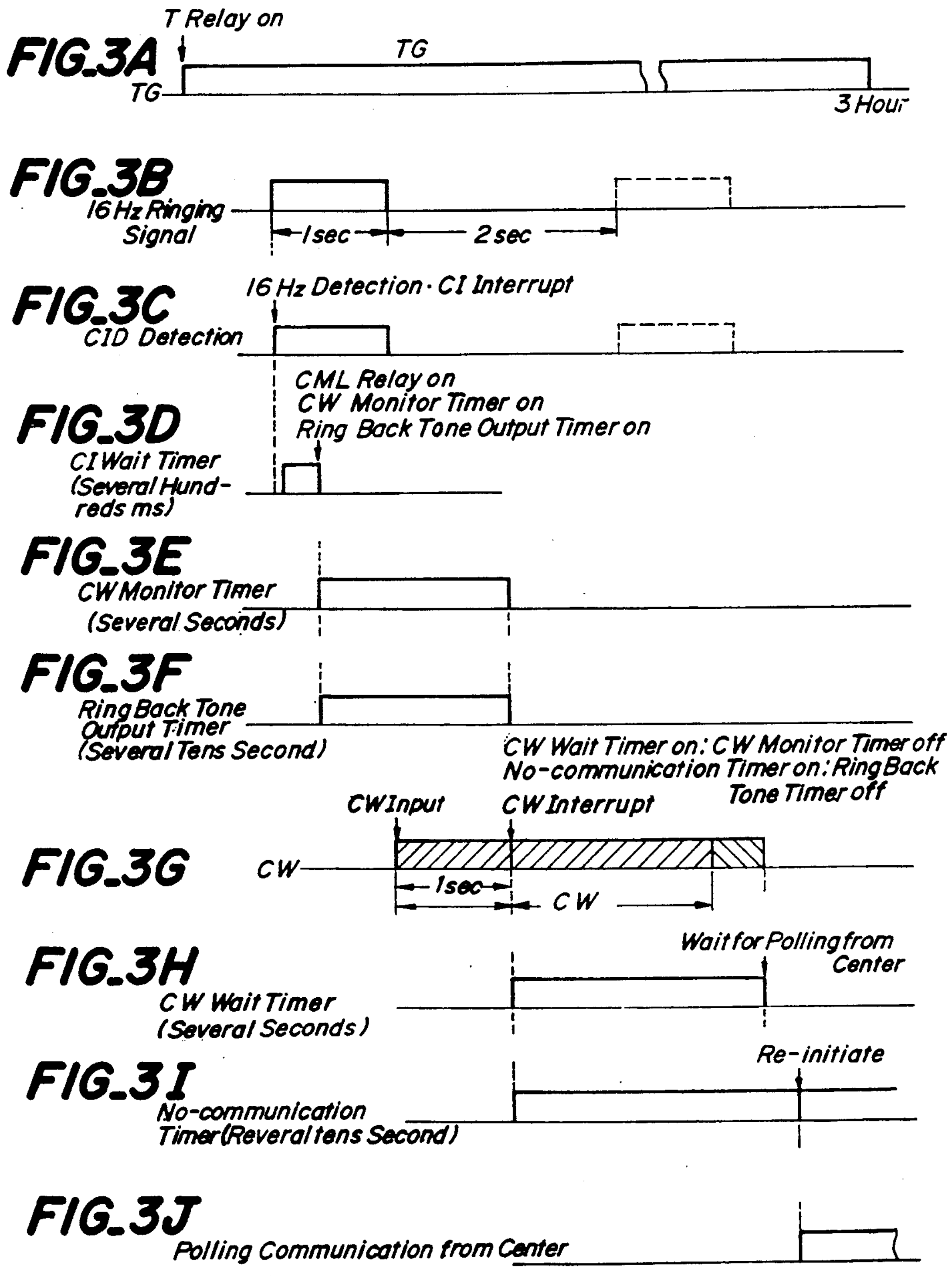
FIG_3A
T Relay on
TG
TG
3 Hour
FIG_3B
16 Hz Ringing Signal
1sec
2sec
FIG_3C
16 Hz Detection · CI Interrupt
CID Detection
CML Relay on
CW Monitor Timer on
Ring Back Tone Output Timer on
FIG_3D
CI Wait Timer (Several Hundreds ms)
FIG_3E
CW Monitor Timer (Several Seconds)
FIG_3F
Ring Back Tone Output Timer (Several Tens Second)
CW Wait Timer on: CW Monitor Timer off
No-communication Timer on: Ring Back Tone Timer off
CW Input
CW Interrupt
FIG_3G
CW
1sec
CW
FIG_3H
Wait for Polling from Center
CW Wait Timer (Several Seconds)
FIG_3I
Re-initiate
No-communication Timer (Reveral tens Second)
FIG_3J
Polling Communication from Center

DATA PROCESSING APPARATUS

This application is a continuation of application Ser. No. 07/241,296, filed Sept. 7, 1988, now abandoned.

BACKGROUND OF THE INVENTION

Field of the Invention and Related Art Statement

The present invention relates to a data processing apparatus for use in an electronic research system in which data produced at a plurality of terminals is transmitted to a data center which statistically processes the data.

In an electronic data processing apparatus such as an apparatus for deriving television audience ratings data and market research data, stored in a number of terminals are transmitted to a data center by means of communication lines such as telephone links. The data center processes the received data to derive the desired television audience ratings data and market research data. In one of the known data processing apparatuses, the transmission of the data from a terminal to the data center is initiated when a main memory is filled with the data. In the terminal, i.e. the panelist's home, a conventional telephone link is used as the data transmission line, and the data transmission is effected during a given time period called a time gate (TG) around midnight or during the early morning in order not to disturb normal usage of the telephone at the panelist's home. The data transmission is initiated in response to a polling procedure from the data center. In Japanese Patent Publication Kokai Sho 54-101,607, there is disclosed a television audience rating research system utilizing the above mentioned method.

At the terminal, the data is converted into a signal having a given format and is stored in RAM. The data read out of RAM is transmitted to the data center once a day or once a week.

The terminal includes a ROM which stores a program and various kinds of fixed constants as well as the telephone number of the data center, the open and close times of the time gate TG, the data format, etc. The contents stored in ROM may be changed. For instance, the data format may be altered by manually operating dip switches.

If the transmission of data from the terminal to the data center were initiated when the main store in the terminal is filled with the data, the data transmission might occur when the panelist is using the telephone or wants to use the telephone. This might interfere with the data transmission. It might also interfere with normal usage of the panelist's telephone, making it rather difficult to obtain the cooperation of the panelist. If a time gate is set during a low traffic time period such as midnight and early morning, and if the number of terminals is increased, it becomes difficult to complete or finish the data transmission process for all the terminals during only the mid night and early morning period, and again the data transmission might compete with the normal usage of the telephone by the panelist. In order to mitigate such a drawback, the number of telephone links and the size of the computer installed in the data center have to be increased. However, since the utilization rate of the telephone links by the data center is very low, such as about 13%, the cost performance of the data center becomes extremely low.

SUMMARY OF THE INVENTION

The present invention has for its object to provide a novel and useful data processing apparatus in which the telephone links and equipment of the data center can be utilized efficiently by effecting the data transmission in a time period other than the time gate, while the competition for the telephone links between the data transmission and the normal usage of the telephone at panelist's home can be avoided effectively.

In general, the research data for television audience ratings and market research are processed in a batch mode, and the data are transmitted from the terminal to the data center once a day or once a week. However, it may be required to obtain television audience ratings for particular television programs, events and commercial programs in a real time mode.

It is another object of the invention to provide a data processing apparatus in which data can be transmitted from the terminals to the data center also in the real time mode.

As was explained above, in ROM provided in the terminal there are stored various kinds of data such as telephone numbers of the data centers, open and close times of a time gate, and a data format. When one or more of these instructions is or are to be altered, the contents of the ROMs in all terminals have to be changed. This requires very cumbersome labor work and therefore, the system could not be changed or expanded freely.

It is still another object of the invention to provide a data processing apparatus in which the above mentioned control instructions can be altered easily and freely by sending commands from the data center to the terminals.

According to the invention, a data processing apparatus for use in an electronic research system in which data collected at a number of panelist's homes data are formed into transmission data having a given format and the transmission data collected at a respective panelist's home is transmitted to at least one data center via a telephone link which is commonly used by a telephone set at the respective panelist's home, comprising center call transmission means for effecting a center call in which the transmission data is transmitted from the panelist's home to the data center in response to a call from the data center to the panelist's home within a predetermined time gate;

terminal call transmission means for effecting a terminal call in which the transmission data is transmitted from the panelist's home to the data center in response to a call from the panelist's home to the data center; and control means for selectively operating said center call transmission means and terminal call transmission means.

In the data processing apparatus according to the invention, panelists' homes are divided into a plurality of groups and the terminal call mode and center call mode can be suitably allocated to these groups. When the center call mode is selected, the telephone link in a panelist's home is connected to the terminal during the predetermined time gate to prepare for receiving the polling call from the data center. Whether the telephone set is in the off-hook condition or the on-hook condition is always checked, and if the off-hook condition is detected, the telephone link is changed at once to the telephone set of the panelist's home, so that any conflict between the data transmission and normal speech communication using the telephone can be avoided. If the data transmission cannot be finished within the predetermined time gate, the time gate may be extended for thirty minutes.

When the terminal call mode is selected, the terminal calls the data center at a predetermined time in a day or on a predetermined day in a week. Also in this terminal call mode, the off-hook condition of the telephone set at the panelist's home is always checked so that the terminal does not call the data center when the telephone set is busy. If there are two data centers, at first the terminal calls the first data center. If the first data center is busy, then the terminal calls the second data center. If the second data center is also busy, the terminal calls the first data center again after a predetermined pause. The above mentioned operation is repeated. When it is confirmed that the data center responds to the call from the terminal, the communication fee is not charged to the panelist. That is to say, the data transmission is effected in the free dial mode.

BRIEF DESCRIPTION OF THE DRAWINGS

FIGS. 3A to 3J depict a timing chart in case of receiving the identifying signal from the center;

DESCRIPTION OF THE PREFERRED EMBODIMENTS

Figure 1:
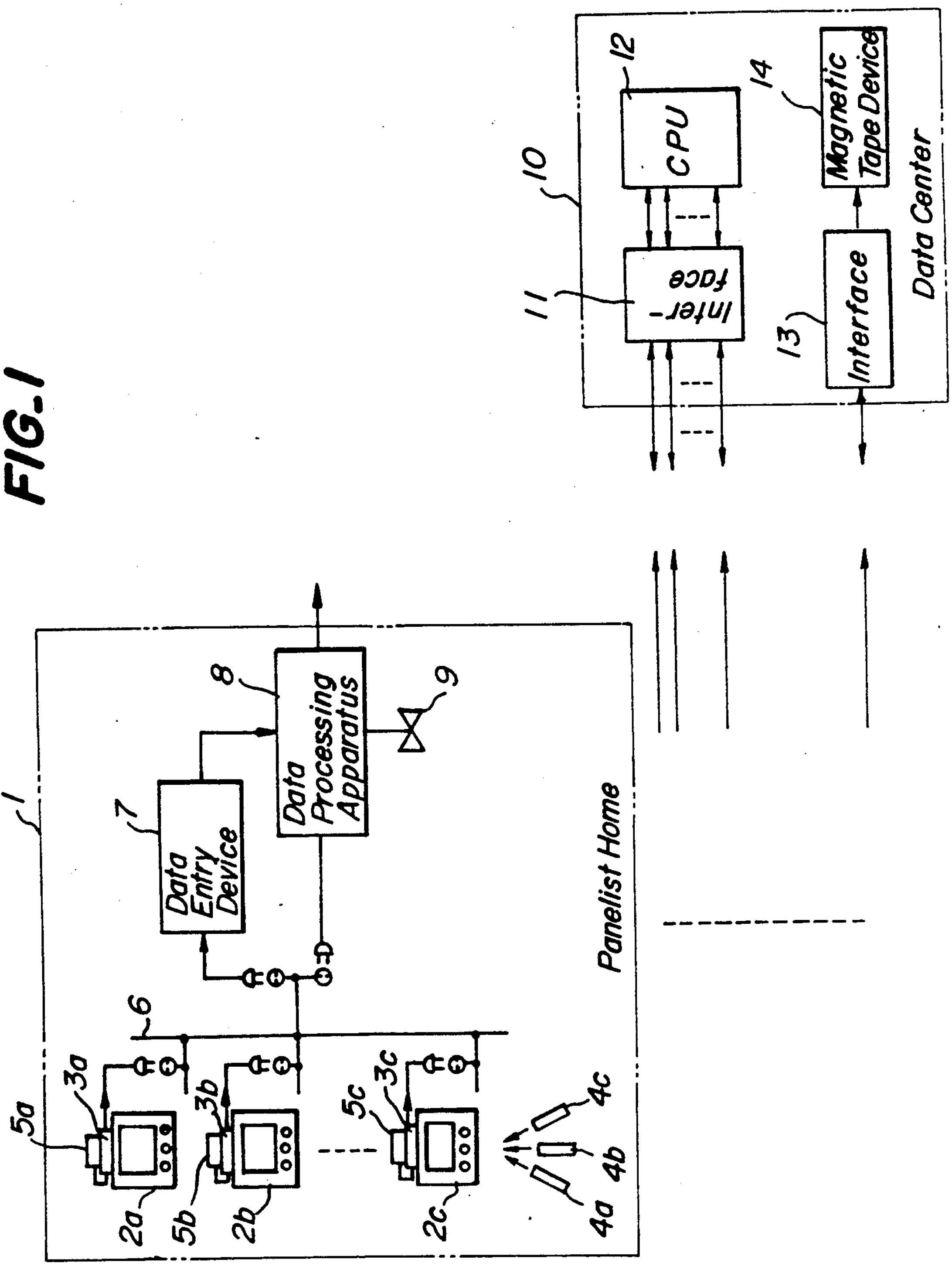
FIG. 1 is a block diagram showing the general construction of a data transmission system using the data processing apparatus according to the invention.

FIG. 1 is a block diagram showing a data transmission system using the data processing apparatus according to the invention. In the present embodiment, the collection of data concerning market research, television audience ratings, and research questionnaires can be carried out over telephone type links. In FIG. 1, reference numeral 1 denotes a panelist's home and reference numeral 10 represents a data center. In the panelist's home 1, channel detectors 3*a*, 3*b* . . . are arranged respectively besides television receiver sets 2*a*, 2*b* . . . , to detect the television channels being viewed. The detected channel data is transmitted to a data processing apparatus 8 according to the invention via domestic power supply lines 6. There is further provided a market research data entry device 7 which includes a barcode reader and a keyboard for entering various kinds concerning data of products purchased by panelists. The entered data is transmitted to the data processing apparatus 8. In the panelist's home 1 there are further provided questionnaire transmitters 4*a*, 4*b* . . . for transmitting answers to questions by means of infrared radiation. By pressing keys provided on the transmitters while watching questions displayed on the television receiver screens, panelists can transmit answers to questionnaire receivers 5*a*, 5*b* . . . It should be noted that the data may alternatively be transmitted with the aid of ultrasonic waves or weak electromagnetic waves. The questionnaire receivers 5*a*, 5*b* . . . are preferably placed on the channel detectors 3*a*, 3*b* . . . , respectively. The data received by the questionnaire receivers 5*a*, 5*b* . . . are supplied to the channel detectors 3*a*, 3*b* . . . , and then are transmitted to the data processing apparatus 8 together with the channel data. The data processing apparatus 8 can identify various kinds of data supplied from the channel detectors 3*a*, 3*b* . . . , market research data entry device 7 and questionnaire transmitters 4*a*, 4*b* . . . , and converts these kinds of data into transmission data having a given format which is then stored. Reference numeral 9 denotes a telephone set provided in the panelist's home, which telephone set utilizes a telephone like link and is operatively connected with the data processing apparatus 8.

The data center 10 comprises computer 12 and interface 11. The computer 12 analyzes various kinds of data transmitted from the panelist's homes to derive market research information and television audience ratings data. The data center 10 further comprises a magnetic tape device 14 and its interface 13 which serve as a back-up for the computer 12. A plurality of telephone lines are connected to the data center 10 so that it can handle a plurality of the terminals or panelist's homes 1 simultaneously.

Figure 2A:
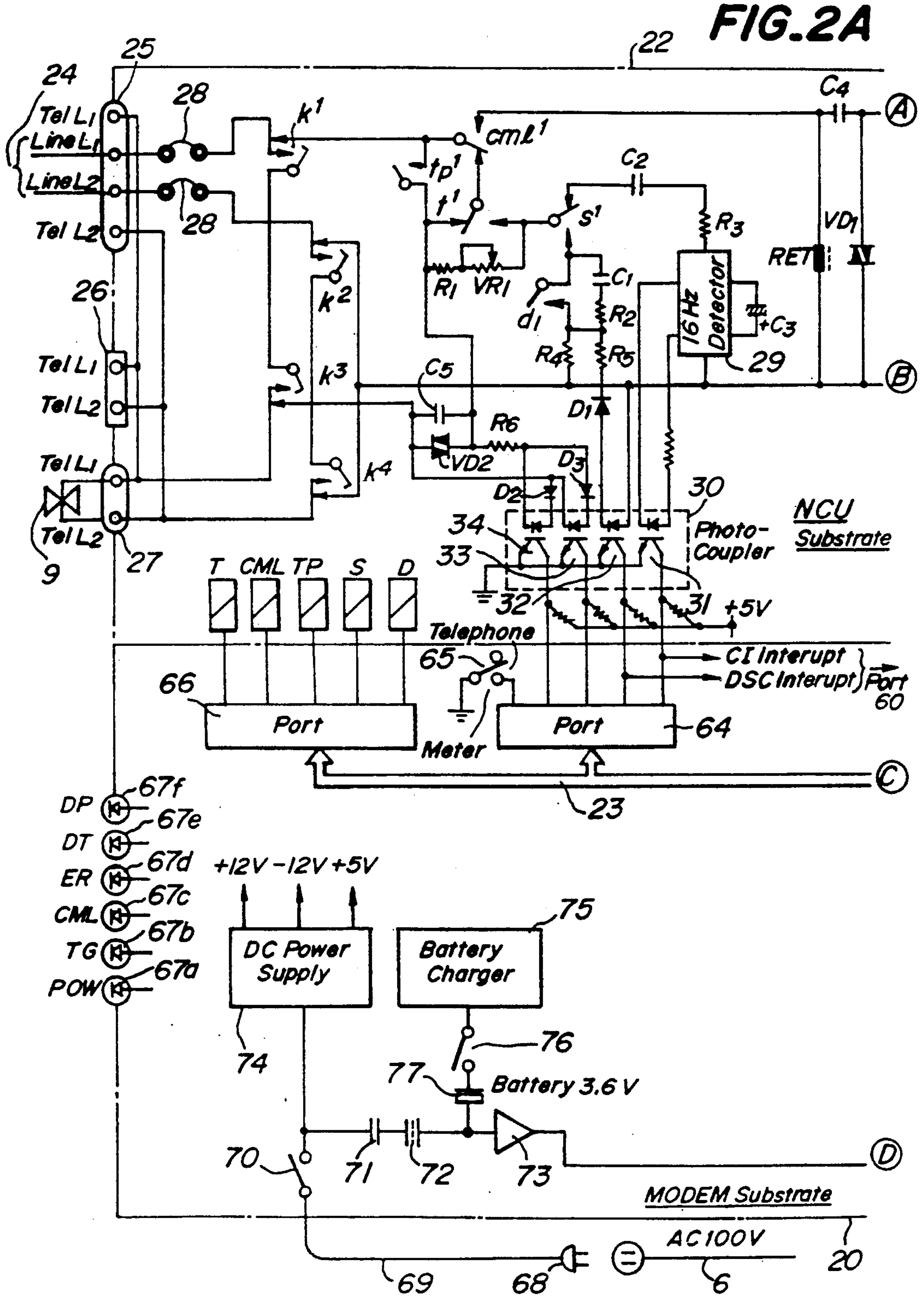
FIGS. 2A, 2B and 2C are block diagrams illustrating an embodiment of the data processing apparatus according to the invention.
Figure 2B:
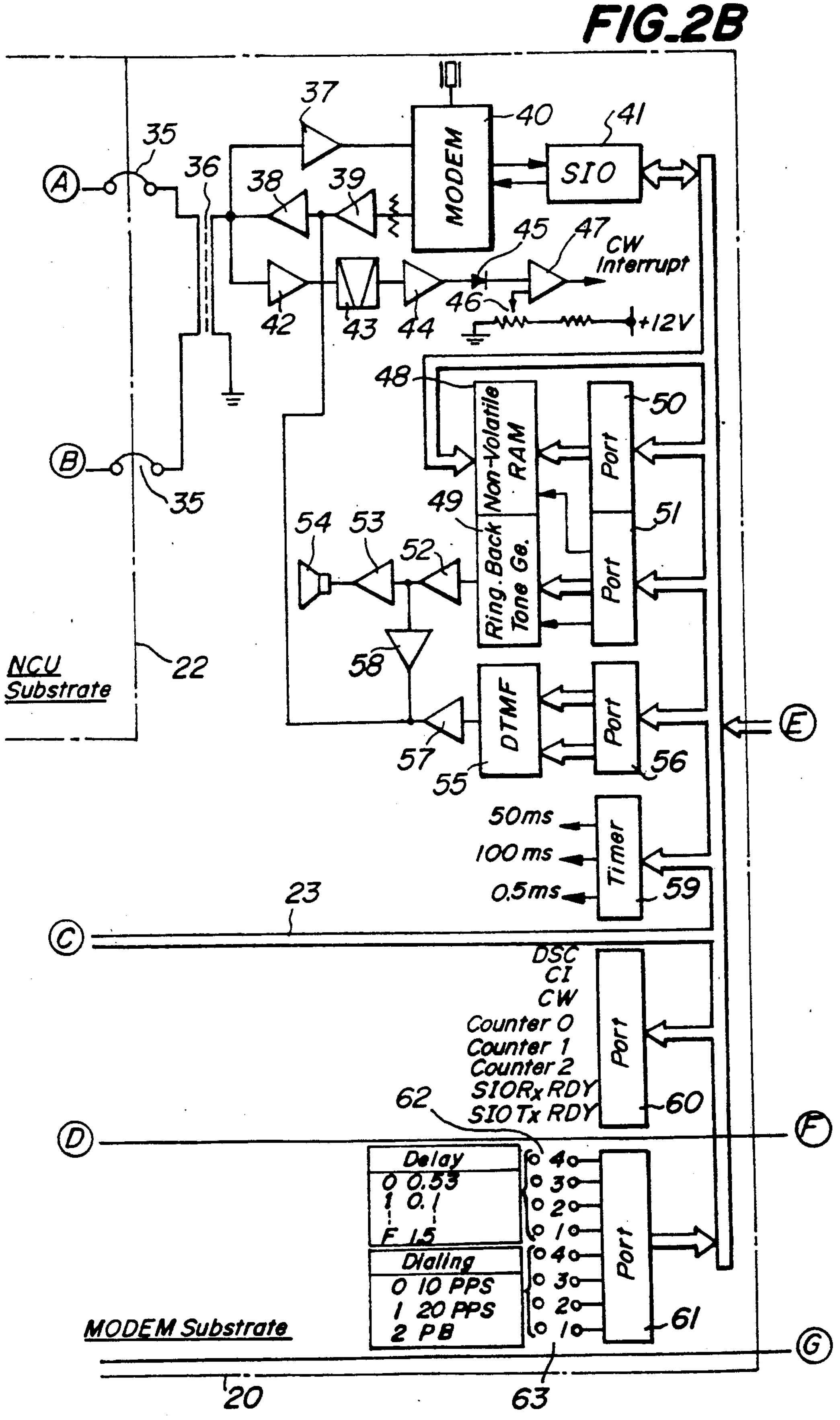
Figure 2C:
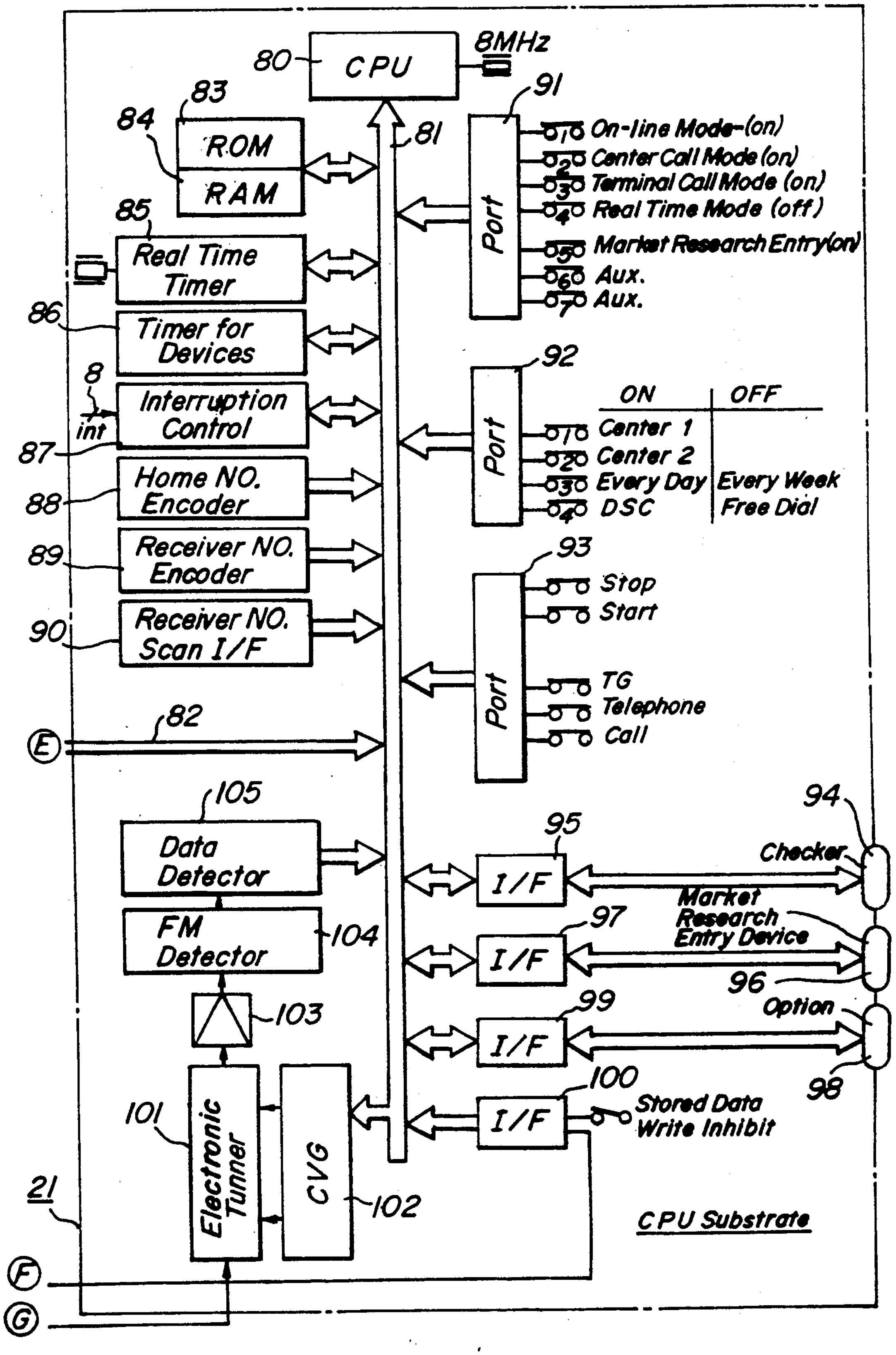

FIGS. 2A, 2B and 2C are block diagrams of an embodiment of the data processing apparatus 8 according to the invention. The data processing apparatus 8 receives the television channel data and personal research data via the domestic power supply lines 6 and the market research data over a cable, and converts the thus received data into given format data which is then stored in a memory. The data is the transmitted to the data center in response to a call from the data center (center call mode) or in response to a call from the terminal (terminal call mode). The data processing apparatus of the present embodiment shares the telephone like link with the telephone set 9, but it is also possible to provide a separate private link. In this case, a switch 65 connected to a port 64 is switched into a meter side. The switch 65 is set to the telephone side when the telephone like link is used in common by the data processing apparatus 8 and the telephone set 9.

As illustrated in FIGS. 2A, 2B and 2C, the data processing apparatus comprises an NCU (Network Control Unit) and MODEM board or substrate 20 and a CPU (Central Processing Unit) board or substrate 21. CPU 80 is arranged on the CPU substrate 21, and common buses 23 and 81 of these substrates 20 and 21 are interconnected with each other by means of a bus 82.

NCU and MODEM substrate 20 comprises NCU 22, MODEM 40, an NCU control circuit, other circuits, and a power source. When a power switch 70 is switched on, a red light emitting diode (LED) 67*a* (POW) is lit. NCU 22 has various functions such as setting of the time gate TG, detection of a call within the time gate TG, detection of a distant station connected (DSC), connection of the MODEM, holding of the D.C. loop, detection of the off-hook condition of the telephone set at the panelist's home and manual selection to the telephone set. A telephone link (lines $L_1$, $L_2$) 24 is connected to a terminal 25 and the telephone set 9 is connected to either one of terminals 25, 26 and 27. The input from the telephone link 24 is connected to the internal circuit via a switcher 28 and manually operated switching contacts $k^1 \sim k^4$. When the center call mode is selected and the time is within the time gate TG, a T relay is energized. The T relay as well as the CML, TP, S, and D relays are controlled by the CPU via a port 66. When the T relay is energized, its contact $t^1$ is changed into a position opposite to that shown in FIG. 2A, so that the input signal from the line $L_1$ is supplied to a 16 Hz detector 29 by means of a $cml^1$ contact, the $t^1$ contact, an $s^1$ contact, capacitor $C_2$ and resistor $R_3$. Further, an amber LED (TG) 67*b* is lit to emit bright orange light. When the call is effected from the center 10, the 16 Hz detector 29 supplies a signal to a light receiving element 31 of a photocoupler 30 and an interruption signal for the calling indicator (CI) is supplied to the port 60. In this manner, CPU 80 detects the call from the center 10. When the interruption for CI is effected, the CML relay is energized and its $cml^1$ contact is changed over from the position shown in FIG. 2A. Then, a green LED (CML) 67*c* is lit. When the CML relay is energized, the D.C. loop is formed via a choke coil RET and the telephone link 24 is connected to the MODEM and other circuits. When the data transmission is effected in response to the polling from the center 10, a center identification signal (abbreviated as CW for Carrier Wave) within an audio frequency range is sent in succession to the calling signal of 16 Hz. The CW signal is transformed by a low frequency transformer 36 and is supplied via amplifier 42, band-pass filter 43 for the center identification signal and amplifier 44 to a rectifier 45. The output signal from the rectifier 45 is applied to one input of a comparator 47. To the other input of comparator 47 is applied a reference voltage formed by a potentiometer 46. When the output from the rectifier 45 exceeds the reference voltage, the interruption for CW is confirmed. In this case, a delay of about one second is provided, so that any erroneous operation due to spurious signals can be avoided. When the interruption for CW is effected, an LED (ER) 67*d* is lit. The message from the center is supplied via an amplifier 37 to MODEM 40 and is demodulated thereby. The demodulated message signal is accessed by CPU 80 via a serial I/O port 41. The data signal stored in the memory of the terminal is supplied via said serial I/O port 41 to the MODEM 40 and is modulated thereby. The modulated data signal is transmitted by means of amplifiers 39 and 38 and transformer 36 to the telephone link 24. Under the control of CPU 80 via a port 51, a ring back tone generator 49 produces a ring back tone which is then supplied via low-pass filter 52 and amplifiers 58 and 38 to the telephone link 24, and at the same time, the ring back tone is supplied via an amplifier 53 to a loud speaker 54. When the telephone set 9 in the panelist's home is of the push button type, there is provided a dual tone multi frequency generator (DTMF) 55 which generates combinations of two frequencies selected from higher and lower frequency groups in accordance with telephone numbers. The tone signal lasts for 70 ms and has a period of 125 ms. While the tone signal is generated, a yellow LED (DT) 67*e* is lit. In order to set the push button mode, switches 63 provided on a port 61 are set to [2:PB]. The push button signal thus formed is supplied on the telephone link via amplifiers 57 and 38. When the telephone set 9 in the panelist's home is of the dial pulse type, the telephone link is connected to a dialing circuit by energizing the T, S and D relays via the port 66. Then, by controlling the D relay, its contact $d^1$ is opened and closed to generate dial pulses. In synchronism with the on and off of the contact $d^1$, a yellow LED (DP) 67*f* is turned on and off. The dial pulse mode is selected by setting the switches 63 on the port 61 to [0:10 PPS] or [1:20 PPS]. There are two pulse rates, i.e. 10 PPS (pulses per second) and 20 PPS. 10 PPS is selected by [0] and 20 PPS is set by [1].

A timer 59 generates real time signals of 0.5 ms, 50 ms and 100 ms which are utilized to set the interruption timings for respective flows and also are used as reference times for various soft timers. A port 60 is made operative when the interruptions for CI, CW and DSC are effected, when counters 0, 1 and 2 provided on the port 60 are in the operative condition, and when the serial I/O port 41 is operative to effect reception or transmission. CPU 80 can detect the condition of the port 60 to know the various conditions. Switches 62 on the port 61 are provided for giving a delay which can prevent any erroneous judgement whether the telephone set is in the off-hook or on-hook condition. The delay time differs for different kinds of telephone sets. A non-volatile RAM 48 stores various kinds of data such as the telephone number of the center, the start and end times of the time gate TG, the start time of the terminal call and initial data necessary for the terminal call. The data stored in RAM 48 is not erased even when the power supply is stopped. The data stored in RAM 48 is read out into the CPU 80 via a port 50. According to one aspect of the present invention, the data stored in the RAM 48 can be rewritten by means of commands from the center 10. There is further provided a D.C. power source 74 which produces +12 V, −12 V and +5 V and energizes a battery charger 75 which charges a battery 77 via a switch 76.

The CPU substrate 21 comprises, in addition to CPU 80, ROM 83 for storing an operation program for the system, RAM 84 for temporarily storing data, real time timer 85 for producing times at which data is generated, timer 86 for producing necessary times for various devices, interruption control circuit 87, home number encoder 88 for generating an identification number for the panelist's home, a receiver number encoder 89 for producing receiver numbers, receiver scanning interface 90 for controlling the scanning of a maximum of eight receivers, terminal 94 for connecting a checker which checks the operation of the system, interface 95 for the checker, terminal 96 for connecting a market research data entry device 7 for entering names, amounts, shops, etc. of purchased goods with the aid of a bar code reader and a keyboard, interface 97 for the market research data entry device, optional terminal 98, optional interface 99, and ports 91, 92 and 93. The port 91 comprises switches for setting the system modes, i.e. on-line mode switch 1, center call mode switch 2, terminal call mode switch 3, real time mode switch 4, market research mode switch 5, and optional switches 7 and 8. The port 92 comprises switches for setting various operations of the terminal call mode. Now it will be assumed that there are two centers. When only the first center (e.g., data center 10) is selected, a switch 1 on the port 92 is closed, and when the second center is selected, a switch 2 is closed. When both the first and second switches 1 and 2 are closed, both the first and second centers are selected. When a terminal call is effected every day, a third switch 3 is closed, but when a terminal call is carried out once in a week, the third switch 3 is open. When the fee for the telephone communication is charged to the transmitter, a fourth switch 4 is closed (DSC), and when a free dial is carried out (i.e., the call charge is paid by the center), the switch 4 is opened. The port 93 comprises start and stop switches, and push button switches for testing the operation of the TG, telephone set and call. By utilizing these switches, the checking operation can be carried out effectively. When the TG switch is pushed, the time gate TG is forcedly closed for two minutes regardless of the actual time. During this period of two minutes, if a call is received from the center, the data collection can be carried out. Therefore, to test and confirm the operation of the terminal, the center may ask the panelist to push this TG switch. Then, it is possible to test and confirm the operation of the terminal in the on-line mode. When the call switch is depressed, it is possible to effect a terminal call regardless of the calling time stored in the non-volatile RAM 48. Therefore, various kinds of tests can be effected freely. When the telephone switch is pushed, the telephone link 24 is connected to the telephone set 9 so that a normal speech communication test may be performed.

The data transmitted from the channel detector 3 (FIG. 1) and transmitter 4 (FIG. 1) over the domestic power supply line 6 is supplied to the electronic tunner 101 (FIG. 2C) via power switch 70, capacitor 71, transformer 72 and amplifier 73 by inserting an AC plug 68 of the data processing apparatus 8 into a socket connected to the domestic power supply line 6. In the electronic tunner 101, the frequencies of carrier waves are scanned with the aid of a control voltage generator (CVG) 102 under the control of CPU 80. The picked-up signal is amplified by an amplifier 103, detected by an FM detector 104 and is decoded by a decoder 105. In this manner, the data signal is decoded and is supplied on the common bus 81. Added to the data signal thus produced are data stored in ROM 83 and the data signals from the other encoders to form the transmission data of the predetermined format. Then the data signal is stored in RAM 84.

In the present embodiment, the data signal stored in RAM 84 is transmitted to the center 10 in either one of a center call mode, a terminal call mode, and a center/terminal call mode. In the center call mode, the time gate TG is set within a low traffic time period during the midnight and early morning and the data signal is transmitted within the time gate TG. TG is set for respective panelist's homes such that the center calls to the panelists' homes do not overlap with each other. In the terminal call mode, the call times for respective panelist's homes are set during a time interval outside the time gate TG such that the call times from respective panelists' homes do not overlap with each other. If a large number of terminals (i.e., panelists' homes) are provided, the data transmission can be effected efficiently by dividing them into a center call group and a terminal call group. As explained above, to select the center call mode the on-line mode switch 1 and center call mode switch 2 of the port 91 are closed. The terminal call mode can be attained by closing the on-line mode switch 1 and terminal call mode switch 3 of the port 91, and when both the modes are to be selected, all the switches 1, 2 and 3 of the port 91 are closed. In the present embodiment, there is further provided the switch 4 on the port 91. When the switch 4 is closed, the telephone link 24 is captured in the real time mode, so that the television audience rating and estimation data for various matters may be collected and calculated in the real time mode.

Next, the time gate TG will be further explained in detail. The time gate TG may be set to three hours from midnight to early morning during which the traffic is small. The start and end times of the time gate TG are stored in the non-volatile RAM 48. CPU 80 interrupts every one second to check whether the start and end times of the time gate have been reached or not. When the start time of the time gate TG has been detected, the T relay is energized to connect the 16 Hz detector 29 to the telephone link 24 after it has been confirmed that the telephone set 9 is not used. When the T relay is de-energized, the time gate TG is closed. These are three cases: when end of the time gate has come without receiving the polling from the center, when the data transmission has been normally ended, and when the telephone set 9 is used by the panelist. If data transmission in the on-line mode has not been completed correctly, the end of the time gate may be extended by, for instance, a half an hour.

Now the operation for a center call will be explained with reference to FIGS. 3A to 3J. During the time gate TG shown in FIG. 3A, when the 16 Hz calling signal (FIG. 3B) is transmitted from the center, the light receiving element 31 (FIG. 2A) is turned on and information denoting that an interruption has been detected is supplied to CPU 80 via the port 64. Since the calling signal CI is present, CPU 80 reads the CI signal to know that an interruption for CI has been effected (FIG. 3C). When the interruption for CI has been detected, a CI wait timer (several hundreds ms) is actuated (FIG. 3D). The CI wait timer is provided for preventing the detection of spurious CI signals due to noise and chattering. After the predetermined time period of the CI wait timer has elapsed, if the CI signal still exists, it is finally judged that an interruption for CI has been effected. Since the calling signal has a duration of one second, a real CI signal lasts after the expiration of the timer period of the CI wait timer. The CI wait timer is a software timer formed by means of CPU 80 on the bias of the timer period of 50 msec. generated by the timer 59. In the present embodiment, there are provided a number of timers, among which only the timer 59 of 0.5 ms, 50 ms and 100 ms and the timer 85 are formed by hardware; the remaining timers are all software timers formed by CPU 80. After the given time of the CI wait timer has elapsed, the CML relay is actuated to connect the telephone link 24 to the MODEM 40, and at the same time, a CW monitor timer (several seconds) and a ring back tone output timer (several tens seconds) are actuated (FIGS. 3E and 3F). The CW monitor timer is provided so that a call from a third party can be detected if a CW interruption is not effected within a given time period from the CI interruption. A ring back tone timer is provided so that the absence of the panelists can be detected, if the telephone set 9 is not in the off-hook condition within a predetermined time period after the CI interruption. Then, the CW signal is sent, and after one second the CW interruption is effected (FIG. 3G). At the same time the CW monitor timer and ring back tone output timer are stopped (FIGS. 3E and 3F). Further, a CW wait timer (several seconds) and a no-communication timer (several tens seconds) are initiated (FIGS. 3H and 3I). After the center has transmitted the center identification signal CW for the given time period, a signal having another frequency is transmitted. The CW wait timer is provided to detect the end of said signal having another frequency. The no-communication timer is provided to open the telephone link 24 if no polling is effected from the center 10 within a certain time period (about 30 seconds) after the CW interruption. If the polling is conducted from the center (FIG. 3J) within said time period, the no-communication timer is initiated again. Then, the no-communication timer is actuated each time a predetermined time period has been elapsed, while the communication from the center is continuing normally. If normal communication cannot be attained due to the condition of the telephone link 24, the link is disconnected at the end of the timer period of the no-communication timer.

Figure 4A:
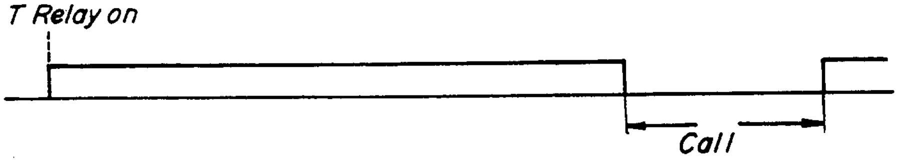
FIGS. 4A to 4K show a timing chart explaining the operation for receiving a call from a third party.
Figure 4B:
Figure 4C:
Figure 4D:
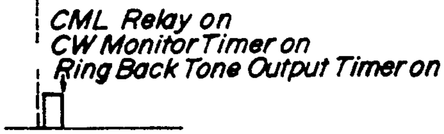
Figure 4E:
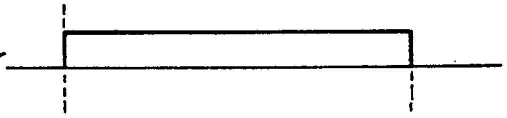
Figure 4F:
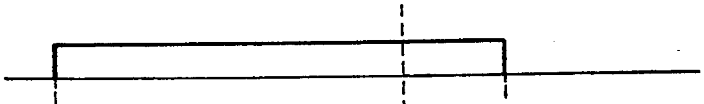
Figure 4G:
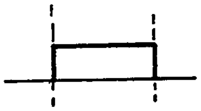
Figure 4H:
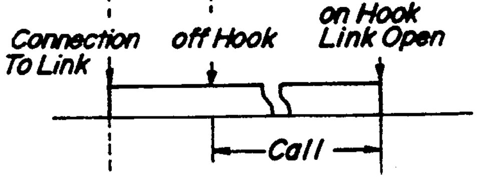
Figure 4I:
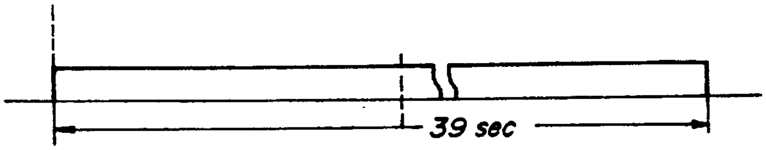
Figure 4J:
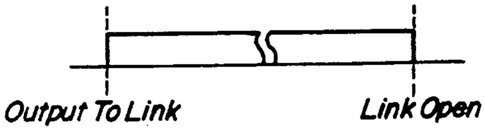
Figure 4K:

FIGS. 4A to 4K show timing charts when a call is effected from a third party during the time gate TG. In this case, the operation of the CI interruption in response to the 16 Hz ringing signal, and the actuation of the CW monitor timer and ring back tone output timer after the predetermined time period defined by the CI wait timer, are entirely same as those explained above with reference to FIGS. 3A to 3D. If the center identification signal CW is not sent, a ring back tone is generated (FIGS. 4G and 4J) after the predetermined time of the CW monitor timer has elapsed (FIG. 4E), and the telephone set 9 is connected to the telephone link 24. When a panelist responds to the ringing by taking the telephone hand-set off-hook, the ring back tone is stopped (FIG. 4G) and the ring back tone output timer is stopped (FIG. 4F). If a panelist does not respond to the ringing, the ring back tone is stopped after the given time period (FIG. 4J) and the telephone set 9 is disconnected from the telephone link 24.

In the present embodiment, the on/off condition of light receiving elements 33 and 34 is checked during the interruption to determine whether the telephone set 9 is in the off-hook condition or in the on-hook condition. When the light receiving elements 33 and 34 are on, the T relay and the CML relay are turned off and the TP relay is turned on so that the telephone link 24 is connected to the telephone set 9 after the off-hook condition has been confirmed. While the telephone set 9 is being used, a similar monitoring operation is carried out, and when the light receiving elements 33, 34 are turned off, the TP relay is turned off after confirming the on-hook condition.

Figure 5A:
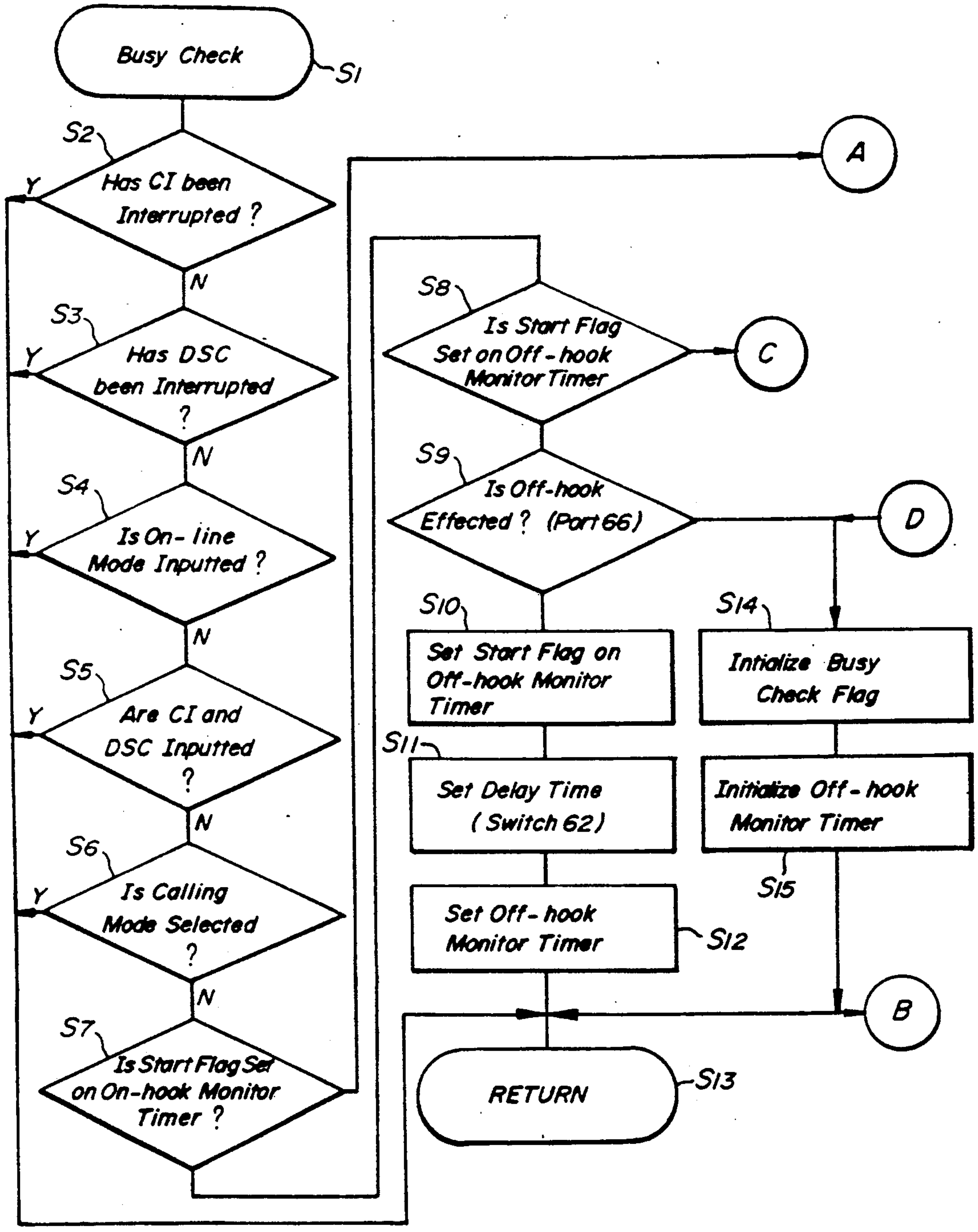
FIGS. 5A and 5B illustrate a flow chart for effecting the busy check.
Figure 5B:
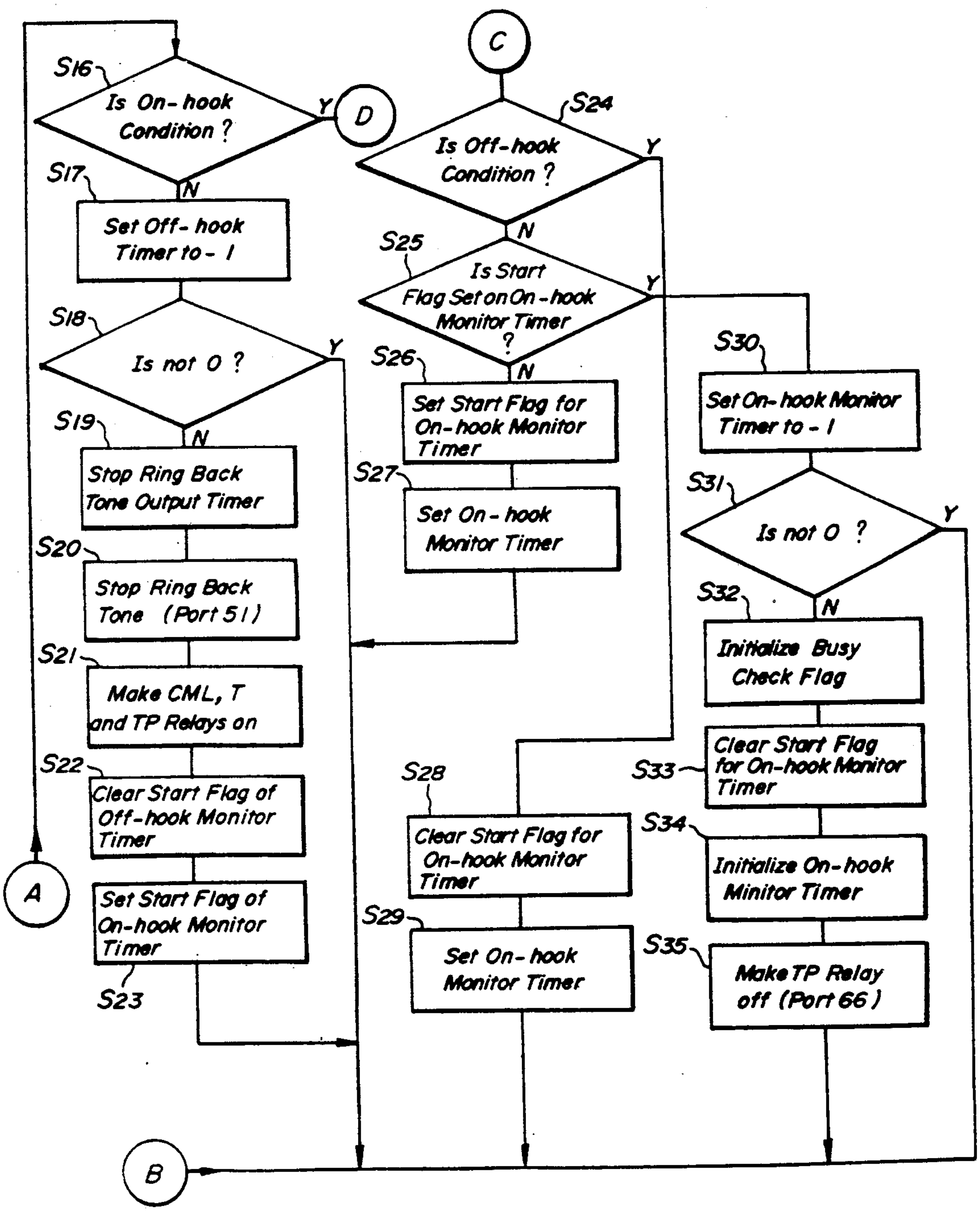

Now the operation of the apparatus will be explained in detail with reference to FIG. 5 showing a flow chart for checking the busy state of the telephone set 9. If a CI interruption has not been effected (N in step $S_2$), a DSC interruption has not been effected (N in step $S_3$), an on-line communication is not carried out (N in step $S_4$), a CI·DSC input is not effected (N in step $S_5$), and the calling mode is not performed (N in step $S_6$), that is to say in case that the start flags for the off-hook monitor timer and on-hook monitor timer have not been set (N in steps $S_7$ and $S_8$), the condition of the port 66 is checked. If the off-hook condition is detected (Y in step $S_9$), the start flag for the off-hook monitor timer is set and the above explained delay time is set for the off-hook monitor timer (step $S_{11}$). If the off-hook condition is not detected (N in step $S_9$), the busy check flag (off-hook flag and on-hook flag) and the off-hook monitor timer are initialized (steps $S_{14}$, $S_{15}$). When the off-hook condition is first detected, since the start flag for the off-hook monitor timer has not been set, the step $S_7$ goes into No. When the off-hook monitor timer is set in the step $S_{10}$, during the next repetitive operation, the step $S_7$ goes into Yes. If the off-hook condition is detected in step $S_{16}$ (N in step $S_{16}$), the busy check is repeated until the off-hook timer becomes zero by the steps $S_{17}$ and $S_{18}$. When the timer becomes zero (N in step $S_{18}$), it is possible to confirm that the handset is in the off-hook condition, so that the ring back tone output timer is stopped (step $S_{19}$) to stop the generation of the ring back tone (step $S_{20}$). Then, the CML and T relays are turned off to disconnect the terminal from the telephone link 24, and further the TP relay is turned on to connect the telephone set 9 to the telephone link (step $S_{21}$). Since the start flag for the off-hook monitor timer is no longer necessary, the start flag is cleared (step $S_{22}$). During the call, it is necessary to monitor spurious on-hook signals, so that the start flag for the on-hook monitor timer is set (step $S_{23}$). Therefore, in a next cycle, the step $S_8$ goes into Yes and the flow goes into the step $S_{24}$. When the off-hook condition is detected to confirm that the telephone set 9 is still being used (Y in step $S_{24}$), the start flag for the on-hook monitor timer is cleared (step $S_{28}$), and the on-hook monitor timer value of 20 seconds is set (step $S_{29}$). The process goes circularly through $S_1 \rightarrow S_2 \rightarrow S_{16} \rightarrow S_{13} \rightarrow S_8 \rightarrow S_{24} \rightarrow S_{13} \rightarrow S_1$ until the on-hook condition is effected. When the telephone set 9 is brought into the on-hook condition, the step $S_{24}$ goes into No, so that the process is transferred to the step $S_{25}$, and the on-hook monitor timer flag is checked. In the first cycle, the flag is not set so that the step $S_{25}$ goes into No, and the flag is set in the step $S_{26}$. Next, the on-hook monitor timer having a timer period of 20 seconds is set (step $S_{27}$), and the above mentioned circular loop is traced again. This time, since the start flag for the on-hook timer has been set, the step $S_{25}$ goes into Yes. By means of steps $S_{30}$ and $S_{31}$, the circulation is effected until the timer period has elapsed. When the timer period becomes zero, the on-hook condition has been confirmed (N in step $S_{31}$), so that the busy check flag is cleared (step $S_{32}$), the on-hook monitor timer flag is cleared (step $S_{33}$), the off-hook monitor timer is initialized (step $S_{34}$) and the TP relay is turned off (step $S_{35}$).

Figure 6:
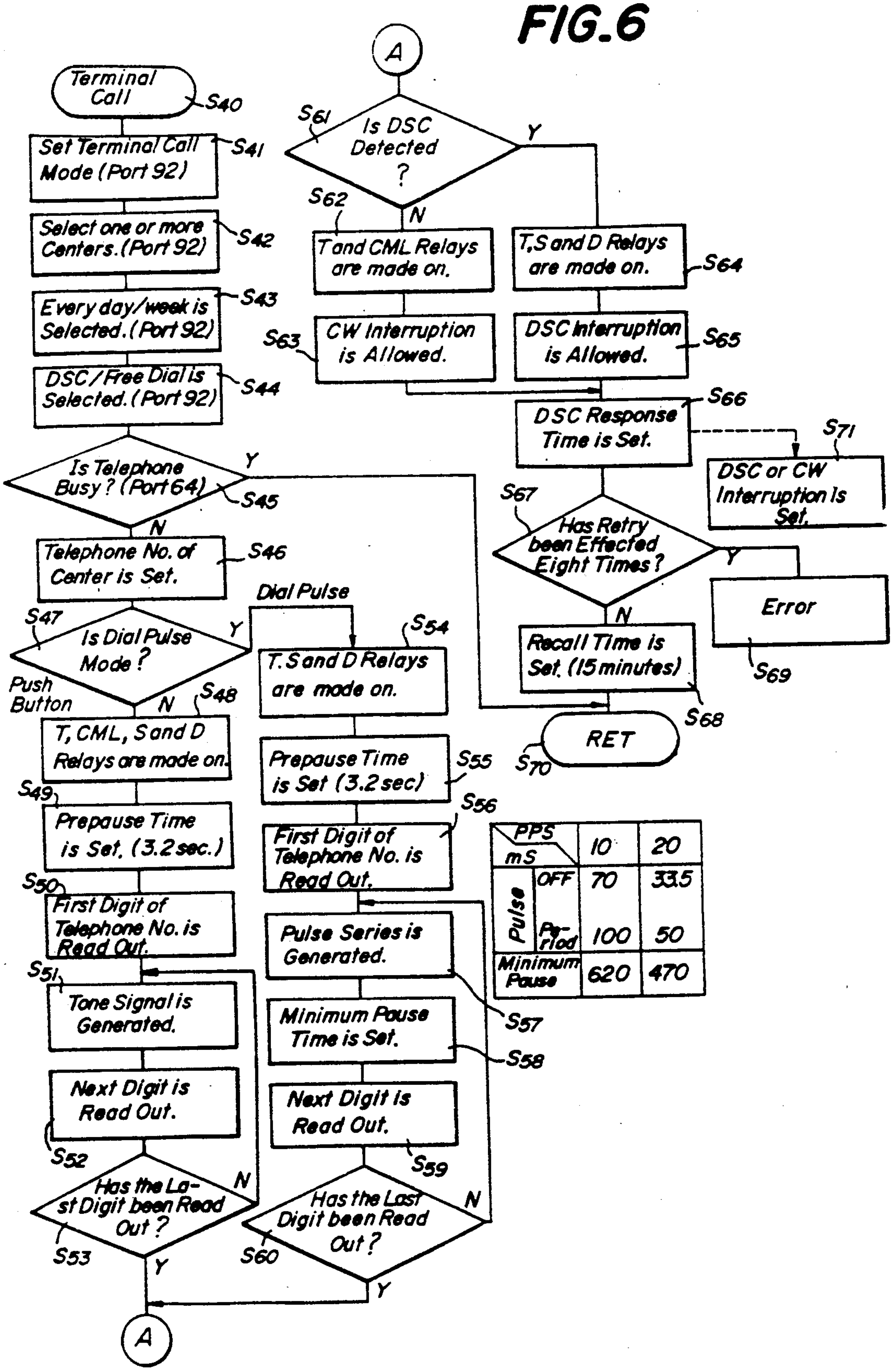
FIG. 6 is a flow chart showing the operation of the terminal call.

Next the operation for a terminal call will be explained with reference to a flow chart illustrated in FIG. 6. When the terminal call mode is selected (step $S_{41}$), one or more centers are selected (step $S_{42}$). A plurality of centers may be provided if the call charge becomes high due to a wide range over which terminals are distributed or if the number of terminals is too large for data to be processed by means of a single center. When either one of the centers 1 and 2 is to be selected, either one of the switches 1 and 2 on the port 92 is closed, and if both the centers are selected, both the switches are closed. Next, either the every day call mode or the every week call mode is selected by using the switch 3 of the port 92 (step $S_{43}$). The switch 4 of the port 92 is used to select DSC or free dial in which the call charge is paid by the center (step $S_{44}$). In case of using the subscriber's private telephone link, since the call for transmitting the data is charged to the center, free dial is usually selected. CPU 80 checks the port 91 using an interruption every second, and if the terminal call mode is selected, the data of the real time timer 85 and the data stored in the non-volatile RAM 48 are compared with each other (step $S_{45}$). When the real time becomes identical with the call time, a check is made to determine whether the telephone set in the panelist's home is being used or not. If the telephone set is being used, the dialing is initiated after the on-hook condition is attained. Next, the port 92 is read out and the telephone number of the center is set in the register (step $S_{46}$). If two centers 1 and 2 have been selected, at first the center 1 is accessed. If the center 1 cannot be accessed, then the center 2 is accessed. This operation is repeated eight times. The next operation differs for pulse dialing and push-button dialing. In case of push-button dialing (N in step $S_{47}$), the T, CML, S and D relays are turned on (step $S_{48}$) so that the telephone link is connected to DTMF circuit 55. Then, a prepause timer having a timer period of 3.2 seconds is set (step $S_{49}$). The prepause period is a time during which the dial signal can be received after the D.C. circuit is closed. According to the normal specification, the prepause time is defined to be 3 seconds, but in the present embodiment the prepause time is set to 3.2 seconds. Next the first digit of the telephone number is read out (step $S_{50}$) and a tone signal corresponding thereto is generated (step $S_{51}$). The width of the tone signal is controlled by a tone output timer having a timer period of 70 ms and the period of the tone signal is controlled by a tone cycle timer having a timer period of 125 ms. Then the next digit of the telephone number is read out (step $S_{52}$), and the process repeats until the last digit has been read out (step $S_{53}$). If the telephone set has a pulse dial (Y in step $S_{47}$), the T, S and D relays are actuated to close contacts $t^1$, $s^1$ and $d^1$ (step $S_{54}$), and the line is closed for the direct current and is connected to the dial pulse transmission circuit. The prepause time of 3.2 seconds is also applied to the pulse dial (step $S_{55}$). The dialing is carried out by changing the D relay from the on condition to the off condition. The pulse off time is controlled by a pulse off timer such that the pulse off time is set to 70 ms for 10 PPS and 33.5 ms for 20 PPS, and at the end of the off time, the D relay is turned on. The pulse period is controlled by a pulse cycle timer which provides 100 ms for 10 PPS and 50 ms for 20 PPS. At the end of the pulse cycle time, the D relay is turned off and the number of pulses is controlled by a dial pulse counter to produce a pulse series (step $S_{57}$). Then after interposing a pause time (minimum pause time is 620 ms for 10 pps and 470 ms for 20 PPS), the next digit of the telephone number is read out (step $S_{59}$) and a corresponding pulse series is generated. This process is repeated until the last digit is read out. The next process differs for DSC and free dial. In the case of DSC (Y in step $S_{61}$), the T, S and D relays are turned on (step $S_{64}$) and the interruption for DSC is allowed (step $S_{65}$), and in the case of free dial (N in step $S_{61}$), the T and CML relays are turned on (step $S_{62}$) and the CW is allowed (step $_{63}$).

As explained above, in the terminal call mode, the response due to CW or DSC from the center is awaited (step $S_{71}$) and if an interruption due to CW or DSC is not performed during the timer period of several tens seconds of the DSC timer, a retry is effected after fifteen minutes. When two centers have been selected, the retry is carried out alternately for the first and second centers. Since a retry is allowed eight times, if the number of retries has not reached the eight times (step $S_{67}$), a recall time of fifteen minutes is set (step $S_{68}$). If communication cannot be effected by the eighth retry, the process is treated as the error (step $S_{69}$).

It is advantageous to effect real time communication in the terminal call mode, and start and end timings may be previously written into the non-volatile RAM 48 from the center. When the real time becomes identical with the start timing, the center is accessed in the terminal call mode and the data is transmitted to the center on a real time basis. Therefore, the telephone link becomes busy. The center immediately processes the received data to provide update data.

As explained above in detail according to the present embodiment, the telephone number of at least one center, the start and end times of the time gate TG, the terminal call time, the data format of the terminal call, the real time call start and end times, etc. are stored in the non-volatile RAM 48, and the data stored therein can be rewritten from the center by means of commands denoted in the on-line protocol. Therefore, even if the terminals are spread over a wide range, alternation and expansion of the data collecting system can be effected at will. Further, the center can read out the data stored in the terminals at any desired time. In the present embodiment, by manually operating the switches provided on the ports it is possible to set the on-line mode, center call mode, or terminal call mode and to select the first and/or second centers, every day communication/every week communication, and DSC/free dial. It should be noted that it is also possible to store necessary data for the above mentioned selections in the non-volatile RAM. Also in this case, the data may be easily altered from the center.

As explained above in detail, in the data processing apparatus according to the invention, data can be easily collected from a number of terminals, because both the center call mode and terminal call mode are prepared in each terminals and the data can be transmitted from the terminal to the center by using any one of the two modes. Usually a center call is carried out from midnight to early morning when the traffic is small, and a terminal call is effected during a high traffic time period. When communication cannot be effected, a retry is repeated for a predetermined number of times. When a plurality of centers are provided, the terminal can access the centers cyclically. This results in that the probability of loss can be further decreased.

Further, the telephone number of the center, the times of time gate TG, the terminal call time, etc. are stored in the non-volatile RAM and can be rewritten from the center, so that expansion and alternation of the system can be carried out at will.

The time gate in the center call mode is set to occur during midnight and early morning, and in the terminal call mode the call times of respective terminals are set such that the terminal calls do not overlap with each other, so that the panelists can use their telephone sets without difficulty.

In case of using the subscriber's telephone set in the panelist's home, the condition of the telephone set is monitored every 50 ms using an interruption and data transmission is effected when the telephone set is not being used. All the cost for transmitting the data is charged to the center so that the system can be easily accepted by the panelists.

Due to the above features, a very large number of panelists can be spread over the whole country without any difficulty and very effective data can be collected.

In addition to the option of every day transmission and every week transmission there is further provided the option of real time transmission, so that responses to television programs that are being broadcasted and the effect of commercials can be promptly obtained at the center. This will lead to an entirely new usage of the system.

In the above embodiment, the data for deriving the television audience rating data and the market research data are collected and processed. However, according to the invention any other data such as atmospheric data, public pollution data, research data for social matters, questionnaire data, etc. can also be collected. It should be noted that the present invention is not limited to the above mentioned embodiment, but many alternations and modifications for circuit construction, timing charts and flow charts may be conceived by those skilled in the art within the scope of the invention.

What is claimed is:

1. A data processing apparatus for use in an electronic research system in which data collected at a panelist's home is formed into transmission data having a given format and the transmission data is transmitted to a data center via a telephone link, the data processing apparatus being disposed at the panelist's home to receive the data collected at the panelist's home and sharing the telephone link with a telephone set at the panelist's home, said data processing apparatus comprising:

center call transmission means for effecting a center call mode in which the data processing apparatus responds to a call from the data center to the panelist's home by transmitting the transmission data from the panelist's home to the data center, the call from the data center occurring within a predetermined time gate;

terminal call transmission means for effecting a terminal call mode in which the data processing apparatus originates a call to the data center, and then transmits the transmission data from the panelist's home to the data center; and control means, connected to said center call transmission means and said terminal call transmission means, for controlling the transmission of the transmission data from the panelist's home to the data center by either of said transmission means, the control means including a non-volatile RAM which stores operational data for controlling at least one of said transmission means, the operational data including data for setting the time gate, and data for denoting at least one telephone number for the data center, a real time timer for indicating the actual time, and means for rewriting the operational data in accordance with commands sent from the data center over the telephone link.

2. An apparatus according to claim 1, wherein said control means comprises means for causing the call to the data center to be originated during a terminal call time which has been set outside of said time gate.

3. An apparatus according to claim 2, wherein the data processing apparatus further comprises a memory for storing the transmission data, wherein said terminal call time is set to recur periodically, and wherein said control means comprises means operative during each periodic recurrence of the terminal call time for reading the transmission data out of said memory for transmission from the panelist's home to the data center.

4. An apparatus according to claim 3, wherein the period of recurrence of said terminal call time is selectable from once a day and once a week.

5. An apparatus according to claim 2, wherein said control means is constructed such that the transmission data is transmitted from the panelist's home to the data center in a real time mode, while the panelist's home and the data center are kept connected to each other via the telephone link.

6. An apparatus according to claim 2, wherein the operational data stored in said non-volatile RAM additionally includes the terminal call time, and the given data format.

7. An apparatus according to claim 2, wherein said control means further comprises means for monitoring the condition of the telephone set at the panelist's home and means for connecting the telephone link to the telephone set when the monitoring means detects an off-hook condition of the telephone set within said time gate.

8. An apparatus according to claim 2, wherein said control means is constructed such that if communication between the panelist's home and the data center cannot be attained, communication is again attempted for a predetermined number of times.

9. An apparatus according to claim 2, wherein the electronic research system includes a plurality of data centers, and wherein said control means is constructed such that said terminal call transmission means successively calls to said plurality of data centers if communication with a data center is not attained during an initial call.

* * * * *